United States Patent
Peterson

(10) Patent No.: US 10,127,166 B2
(45) Date of Patent: Nov. 13, 2018

(54) DATA STORAGE CONTROLLER WITH MULTIPLE PIPELINES

(71) Applicant: SanDisk Technologies LLC, Plano, TX (US)

(72) Inventor: James G. Peterson, San Jose, CA (US)

(73) Assignee: SanDisk Technologies LLC, Addison, TX (US)

( * ) Notice: Subject to any disclaimer, the term of this patent is extended or adjusted under 35 U.S.C. 154(b) by 0 days.

(21) Appl. No.: 14/254,525

(22) Filed: Apr. 16, 2014

(65) Prior Publication Data

US 2014/0351526 A1    Nov. 27, 2014

Related U.S. Application Data

(60) Provisional application No. 61/825,647, filed on May 21, 2013.

(51) Int. Cl.

| | |
|---|---|
| *G06F 12/02* | (2006.01) |
| *G06F 13/28* | (2006.01) |
| *G06F 13/16* | (2006.01) |
| *G06F 21/79* | (2013.01) |
| *G06F 21/85* | (2013.01) |

(52) U.S. Cl.
CPC ........ *G06F 13/287* (2013.01); *G06F 13/1652* (2013.01); *G06F 13/1684* (2013.01); *G06F 21/79* (2013.01); *G06F 21/85* (2013.01); *G06F 2221/2107* (2013.01); *G06F 2221/2143* (2013.01)

(58) Field of Classification Search
CPC .... G06F 12/0246; G06F 3/067; G11C 7/1075
See application file for complete search history.

(56) References Cited

U.S. PATENT DOCUMENTS

| | | | | |
|---|---|---|---|---|
| 5,809,539 | A * | 9/1998 | Sakakibara | G06F 13/1631 711/127 |
| 8,189,407 | B2 | 5/2012 | Strasser et al. | |
| 9,047,959 | B1 * | 6/2015 | Myouga | G11C 16/10 |
| 2008/0229079 | A1 * | 9/2008 | Flynn | G06F 1/183 712/220 |
| 2009/0222617 | A1 * | 9/2009 | Yano | G06F 12/0246 711/103 |
| 2010/0250826 | A1 * | 9/2010 | Jeddeloh | G06F 13/1684 711/103 |
| 2011/0138100 | A1 * | 6/2011 | Sinclair | G06F 13/1647 711/5 |

(Continued)

*Primary Examiner* — Adam M Queler
*Assistant Examiner* — Trang K Ta
(74) *Attorney, Agent, or Firm* — Loza & Loza, LLP; Gabriel Fitch

(57) ABSTRACT

Techniques are disclosed relating to processing data in a storage controller. In one embodiment, a method includes receiving data at a storage controller of a storage device. The method further includes processing data units of the data in parallel via a plurality of write pipelines in the storage controller. The method further includes writing the data units to a storage medium of the storage device. In some embodiments, the method may include inserting header information into the data for a plurality of data units before processing, and the header information may include sequence information. In some embodiments, writing the data units may include writing according to a sequence determined prior to processing the data units.

19 Claims, 9 Drawing Sheets

(56) References Cited

U.S. PATENT DOCUMENTS

| | | |
|---|---|---|
| 2011/0157992 A1 | 6/2011 | Strasser et al. |
| 2012/0239860 A1* | 9/2012 | Atkisson et al. ............. 711/103 |
| 2013/0166855 A1 | 6/2013 | Batwara et al. |
| 2013/0326284 A1 | 12/2013 | Losh et al. |
| 2014/0281136 A1* | 9/2014 | Wakrat ................ G06F 12/0246 |
| | | 711/103 |

\* cited by examiner

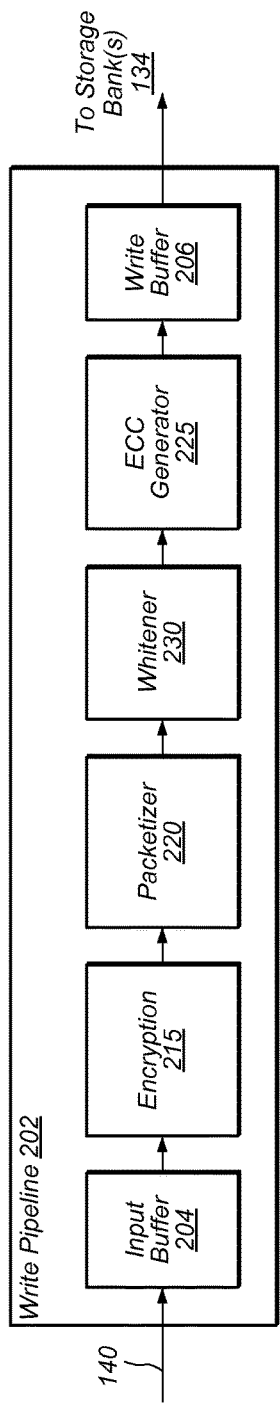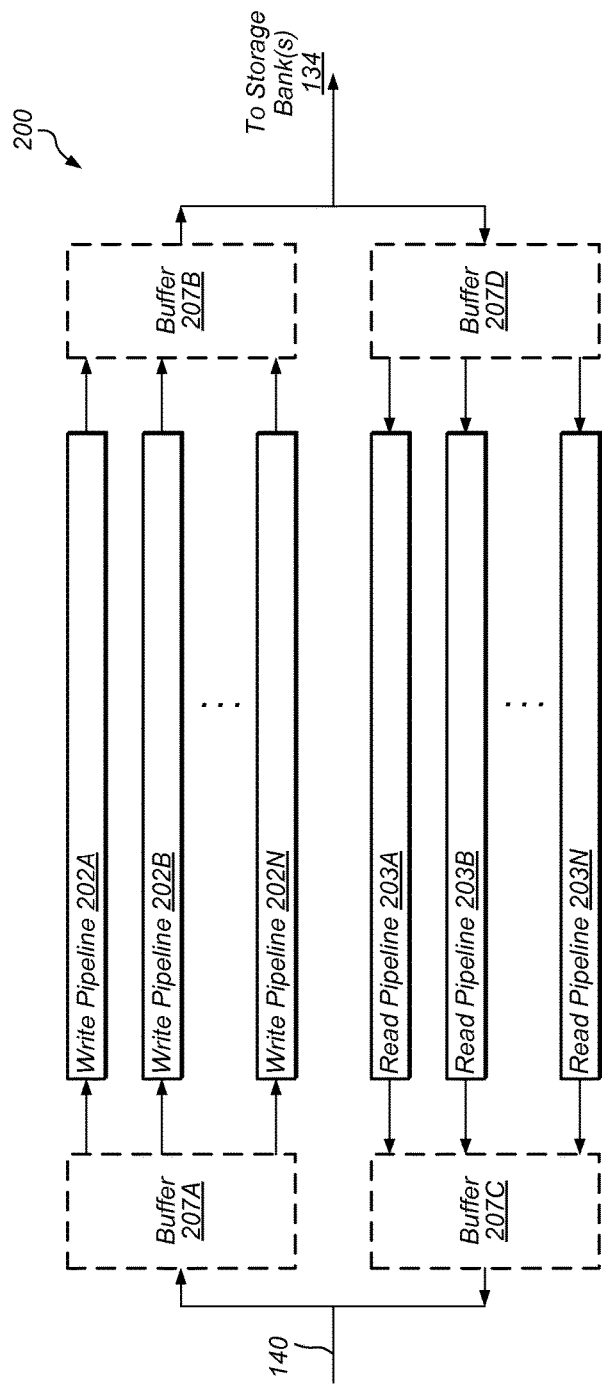
FIG. 2A
FIG. 2B

DATA STORAGE CONTROLLER WITH MULTIPLE PIPELINES

This application claims the benefit of U.S. Provisional Appl. No. 61/825,647, filed on May 21, 2013, which is incorporated by reference herein in its entirety.

BACKGROUND

Technical Field

This disclosure relates generally to accessing data on a physical recording medium, and more specifically to a storage controller that reads data from and writes data to a physical recording medium.

Description of the Related Art

Storage controllers often perform various data processing operations when accessing data on storage media. These operations may be performed using a data processing pipeline in which processing elements perform an operation on a data block and then pass the data block on to other processing elements for further operations. For high-speed storage devices such as solid-state storage devices, high-bandwidth processing pipelines may be required. The bandwidth of a processing pipeline may be limited by the width of the pipeline and the clock rate of the pipeline. Wider and/or higher-speed pipelines may be more expensive to produce, consume more power, and/or require greater area.

SUMMARY

The present disclosure describes embodiments of techniques for processing data in a storage controller. These techniques may improve bandwidth of reads and writes from storage media without increasing data processing pipeline clock speeds.

In one embodiment, a method includes receiving data at a storage controller of a storage device. The method further includes processing data units of the data in parallel via a plurality of write pipelines in the storage controller. The method further includes writing the data units to a storage medium of the storage device. In some embodiments, the method may include inserting header information into the data for a plurality of data units before processing, and the header information may include sequence information. In some embodiments, writing the data units may include writing according to a sequence determined prior to processing the data units.

In another embodiment, an apparatus includes a storage medium, a packetizing module, and a plurality of data processing pipelines. In this embodiment, the packetizing module is configured to insert information into data received by the apparatus. In this embodiment, the plurality of data processing pipeline is configured to concurrently perform one or more operations on received portions of the data. In this embodiment, the apparatus is configured to write processed portions of the data to the storage medium.

In yet another embodiment, an apparatus includes a plurality of data processing pipelines and a de-packetizing module. In this embodiment, the plurality of data processing pipelines are configured to perform one or more operations concurrently on portions of a stream of data retrieved from a storage medium. In this embodiment, the de-packetizing module is configured to read information from the portions of the stream of data and to provide the portions in a particular order.

In yet another embodiment, an apparatus includes a first means for receiving a stream of data and forming the data into discrete data units, a second means for separately processing portions the data units simultaneously, and a third means for writing the data units to a storage medium.

BRIEF DESCRIPTION OF THE DRAWINGS

FIG. 2A is a block diagram illustrating one embodiment of a write pipeline of a storage controller.

FIG. 2B is a block diagram illustrating one embodiment of a system that includes multiple write pipelines and multiple read pipelines.

Figure 1:
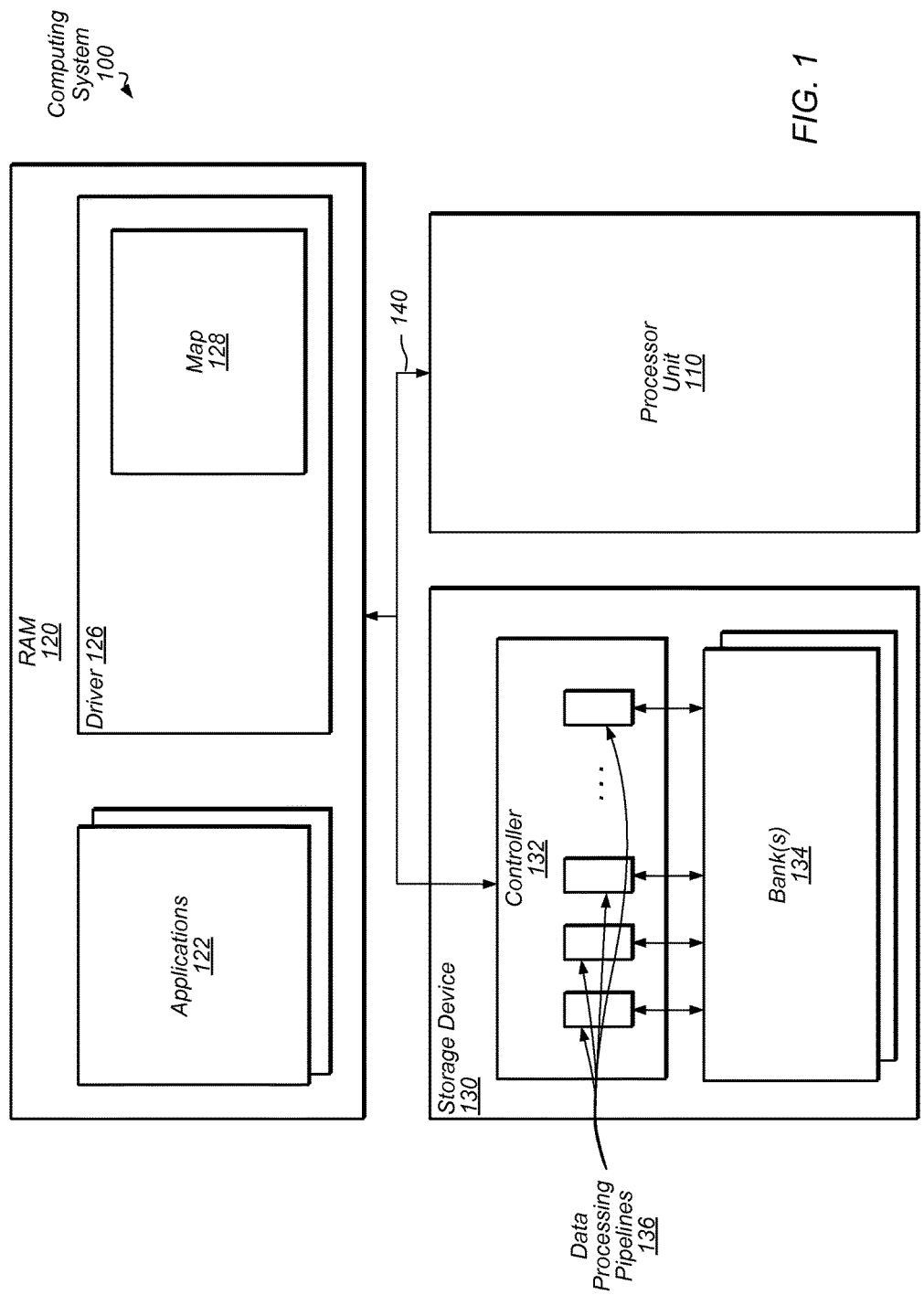
FIG. 1 is a block diagram illustrating one embodiment of a computing system that includes a storage controller.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. § 112, sixth paragraph, for that unit/circuit/component.

As used herein, the term "based on" is used to describe one or more factors that affect a determination. This term does not foreclose additional factors that may affect a determination. That is, a determination may be solely based on those factors or based, at least in part, on those factors.

Consider the phrase "determine A based on B." While in this case, B is a factor that affects the determination of A, such a phrase does not foreclose the determination of A from also being based on C. In other instances, A may be determined based solely on B.

DETAILED DESCRIPTION

The disclosure initially describes, with reference to FIGS. 1 and 2A-2B, a computing system that includes a storage controller with multiple parallel data processing pipelines. To facilitate this description, logical and physical address spaces associated with the storage device are described with reference to FIGS. 3A-3C. Further embodiments of the storage controller with multiple read and/or write pipelines are described in further detail with reference to FIGS. 4-8.

Turning now to FIG. 1, a block diagram of a computing system 100 that includes a storage controller is depicted. Computing system 100 may be any suitable type of computing device such as a server, laptop, desktop, a mobile device, etc. In some embodiments, computing system 100 may include multiple computing devices working together. For example, in one embodiment, computing system 100 may be multiple servers coupled together at a data center configured to store data on behalf of multiple clients, such as the storage system discussed below in conjunction with FIG. 8. In the illustrated embodiment, computing system 100 includes a processor unit 110, random access memory (RAM) 120, and storage device 130 coupled together via an interconnect 140. As shown, RAM 120 may include program instructions for one or more applications 122. RAM may include a driver 126 for storage device 130, which, in turn, may include a controller 132 and one or more storage banks 134. Driver 126 may include a map 128. Each storage bank 134 may include multiple dies or pads. As depicted, controller 132 may include a plurality of data processing pipelines 136.

Storage device 130 may be any device that includes one or more physical media upon which data can be recorded. As used herein, the term "recorded" refers broadly to the process of an electronic computing device storing, writing or otherwise transferring one or more data values on to some physical recording medium for subsequent use. Accordingly, a "physical recording medium" is used herein to refer to any medium on which data may be recorded by a device. Further, the terms "storage" and "memory" are used herein to be synonymous with "physical recording medium." Given this broad definition, the designations memory (when referring to RAM 120) and storage (when referring to storage device 130) in FIG. 1 and elsewhere in this disclosure may refer to volatile and/or non-volatile media. Such media may also be referred to herein as "memory," and portions of such media may be referred to as "blocks," "cells," "storage blocks," "memory blocks," etc. Collectively, a group of these blocks may be referred to as a "storage array," "memory array," etc. References in this disclosure to "accessing" data in storage device 130 or "storage requests" to storage device 130 refer to any type of transaction, including writing data to storage device 130 and/or reading data from storage device 130, as well as, TRIM operations, maintenance accesses, discovery accesses, load and store operations under memory semantics, and the like. Further, given the broad definitions of "storage" and "memory" referred to above, these accesses may be applicable to a storage device that has non-volatile memory and/or volatile components.

In some embodiments, storage device 130 may be implemented such that it includes non-volatile memory. Accordingly, in such an embodiment, storage banks 134 may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage device 130 may be implemented such that it includes non-volatile solid-state memory. Accordingly, in such an embodiment, storage banks 134 may include any suitable type of solid-state storage media including, but not limited to, NAND flash memory, NOR flash memory, nano RAM ("NRAM"), magneto-resistive RAM ("MRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), etc. In some embodiments, storage banks 134 may include multiple, different types of solid-state storage media.

In other embodiments, storage device 130 may be implemented such that it includes volatile memory. Storage banks 134 may thus correspond to any suitable volatile memory including, but not limited to such as RAM, dynamic RAM (DRAM), static RAM (SRAM), synchronous dynamic RAM (SDRAM), etc. Although shown independently of processor unit 110, in some embodiments, storage device 130 may correspond to memory within processor unit 110 such as one or more cache levels (e.g., L1, L2, L3, etc.) within processor unit 110.

In sum, various functionality will be described herein pertaining to storage device 130. Such functionality may be applicable to any suitable form of memory including both non-volatile and volatile forms. Thus, while particular embodiments are described herein within the context of non-volatile solid-state memory arrays, those descriptions may also be applicable to other recording media such as volatile memories and other types of non-volatile memories, particularly those that include a reclamation process.

Controller 132, in one embodiment, is configured to manage operation of storage device 130. Accordingly, controller 132 may facilitate performance of read operations at specified addresses (e.g., "physical addresses" as discussed below) including selecting the appropriate storage banks 134 and accessing the data within the appropriate cells within those banks. Controller 132 may facilitate performance of write operations including programming of particular cells. Controller 132 may also perform preparation operations to permit subsequent writes to storage media of storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In the illustrated embodiment, controller 132 includes a plurality of data processing pipelines 136 for processing read and/or write data in parallel. Such data pipelines may process data units concurrently and/or simultaneously. Further embodiments of data processing pipelines 136 are described in further detail below with reference to FIGS. 4-5. Controller 132 may be configured to control the pipeline functionality described herein using ASICs (Application Specific Integrated Circuits), software or firmware executed on one or more processor cores, and/or programmable hardware devices such as a field programmable gate array (FPGA), as well as any combinations thereof.

In one embodiment, controller 132 is also configured to communicate with driver 126 (discussed below) over interconnect 140. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment ("serial ATA" or "SATA"), parallel ATA ("PATA"), small computer system interface ("SCSI"), IEEE 1394 ("FireWire"), Fiber Channel, universal serial bus ("USB"), etc. In some embodiments, controller 132 may also perform other operations such as error checking, data compression, encryption and decryption, whitening, packet assembly and disassembly, etc. Data processing pipelines 136 may perform one or more of these operations in parallel.

In various embodiments, data stored in storage device 130 is organized as log-structured storage. As used herein, the term "log structure" refers to an arrangement of data on a storage medium in which an append point is used to determine where subsequent new or updated data is to be stored; the append point is advanced sequentially through an "address space" as data is stored. The append point may serve as the implicit destination address for writes to storage device 130. A log-structured storage is simply data of a storage device that is organized using a log structure. The use of a log structure also connotes that metadata is stored on a non-volatile media in order to permit the storage device 130 to be restored to a previous state. Such a restoration may be performed, for example, to facilitate crash recovery in the event of power loss, to recover a last known valid state in the event of data corruption, etc. As used herein, the term "address space" refers to a range of addresses that can be used to specify data within a storage device. As will be described below, a log-structured storage may have both logical and physical address spaces. The term "logical address space" refers to an address space as perceived by higher-level processes even though this address space may not be representative of how data is actually organized on the physical media of storage device 130 or the number of physical address locations actually in use, reserved, or allocated to a higher-level process. In contrast, the term "physical address space" refers to the address space used by lower-level processes and may be indicative of how data is organized on the physical media of storage device 130 and the actual number of physical address locations in use by a higher-level process. Embodiments of logical and physical address spaces are discussed in further detail in conjunction with FIGS. 3A and 3B, respectively. One embodiment of a log structure is discussed in conjunction with FIG. 3C.

In various embodiments, using a log structure may permit multiple instances of a set of data to be present in storage device 130 as the data is written, modified, and rewritten to storage. As part of tracking data in a physical address space, older instances of stored data (i.e., those instances that are not the current instance) may be indicated as invalid. For example, in one embodiment, when a value is to be updated, the value may be written at a storage block specified by the current append point (rather than at the location where the value was previously stored). In response to the write being successfully performed, any previously stored instances of that value may be marked as invalid. As used herein, the term "invalid" refers to data that no longer needs to be stored by the system (e.g., because a newer copy of the data exists).

Similarly, the term "invalidating" refers to the marking of data as invalid (e.g., storing a record in a data structure) or to the storing of an instance of data when a previous instance of the data existed in storage device 130, the storing making the previous instance invalid.

Applications 122, in one embodiment, include program instructions that are executable by processor unit 110. As will be described below, applications 122 may utilize various hardware of computing system such as processor unit 110, RAM 120, and storage device 130. An operating system or hypervisor may allocate portions of storage device 130 and/or portions of RAM 120 to applications 122.

Driver 126, in one embodiment, is executable to permit applications 122 to interact with storage device 130. Accordingly, driver 126 may receive requests to perform read and write operations at specified logical addresses and may issue corresponding commands to controller 132 to implement those operations. In some embodiments, driver 126 manages garbage collection for storage device 130 to reclaim storage blocks with invalid data. As used herein, "reclaiming" a storage block or "reclamation" of a storage block refers to preparing the storage block for reuse (i.e., so that the storage block can store new data). In the case of flash media, reclamation may include copying valid data out of the storage block and erasing the block. In some embodiments, to facilitate performance of read and write operations, driver 126 also maps logical addresses (e.g., logical block addresses "LBAs") to corresponding physical addresses (in other embodiments, mapping logical addresses to physical addresses may be performed elsewhere, such as at controller 132). Accordingly, driver 126 may also manage map 128 including adding and removing translations from map 128 as data is managed on storage device 130.

In one embodiment, driver 126 uses map 128 to map (i.e., translate) logical addresses to physical addresses within storage device 130. Accordingly, as data becomes moved and invalidated, the data may reside in different physical addresses on storage device 130 over time. Through the use of map 128, however, an application may be able access a most recent set of data by specifying the same logical address (e.g., LBA) even though two or more versions of the data may reside at different physical addresses. Map 128 may be implemented using any suitable data structure. Accordingly, in one embodiment, map 128 is a tree data structure (e.g., binary tree, B-tree, etc.). In other embodiments, map 128 may be an array, a linked list, a hash table, etc. In some embodiments, map 128 may be implemented using multiple data structures.

Turning now to FIG. 2A, one embodiment of a write pipeline 202 of controller 132 is depicted. In the illustrated embodiment, write pipeline 202 is configured to receive data via interconnect 140 and write the data to storage banks 134. In some embodiments, controller 132 may retrieve data from RAM 120 using a DMA unit (not shown). In the illustrated embodiment, write pipeline 202 includes input buffer 204, encryption unit 215, packetizer 220, whitener 230, ECC generator 225, and write buffer 206.

Write pipeline 202 may be described as a data processing pipeline. The concept of a "data processing pipeline" is well understood, and refers to the concept of splitting the "work" that a unit performs on data units into multiple stages. In the illustrated embodiment, encryption, whitening, ECC encoding, etc. are examples of different data pipeline stages. A "write pipeline" refers to a data processing pipeline for data to be written to storage media and a "read pipeline" refers to a data processing pipeline for data retrieved from storage media. Further, as used herein, the term "data processing element" refers to various elements or combinations of elements configured to process blocks of data. Data processing elements include, for example, circuits such as an ASIC (Application Specific Integrated Circuit), portions or circuits of individual processor cores, entire processor cores, individual processors, and/or programmable hardware devices such as a field programmable gate array (FPGA), as well as any combinations thereof.

Input buffer 204 may be configured to store received data for writing to storage media of storage device 130. Input buffer 204 may allow for different clock domains between interconnect 140 and write pipeline 202.

Encryption unit 215 may be configured to perform various encryption operations on data from input buffer 204 before passing the data on to packetizer 220. Data encryption may protect data in the event that a storage device is stolen or accessed by unauthorized third parties.

As used herein, the term "packetizer" refers to a module configured to form data into packets, blocks, or any of various bundled units. These discrete packets, blocks, and/or bundled units are referred to herein as "data units." Packetizer 220 may be configured to perform this functionality for data received from encryption unit 215. Data units are not limited to packets or ECC codewords but may be formed at various appropriate granularities. Data units may be fixed or variable in size. Packetizer 220 may be configured to insert header information for each data unit and the header information may indicate the size of a data unit in embodiments where data units are variable in size. The length of the header may vary depending on whether a packet is fixed length of variable. In some embodiments, packetizer 220 may be configured to insert multiple headers into a single data unit or to insert a single header for multiple data units. The header information may include sequencing information indicating an ordering of the data units, e.g., according to a log structure. Header information, in various embodiments, may be inserted at any appropriate location(s) in a data unit including the beginning, middle, and/or end of a data unit. Packetizer 220 may also be configured to send data through without inserting header information and/or to generate data according to a particular pattern for a number of cycles. Packetizer 220 may perform these functions in response to a packetizer command from driver 126 or controller 132.

Whitener 230 may be configured to whiten data by breaking up particular patterns, e.g., of 1's and 0's. Whitener 230 may combine incoming data with a pseudo-random pattern. Whitening may be used in the context of solid state storage media to avoid bit failures caused by DC bias, for example. "Whitening" includes any of various operations to affect data patterns such as decorrelation, management of DC bias, scrambling, and pseudo-randomization of data, for example.

ECC generator 225 may be configured to generate error correcting code in order to detect and correct data corruption. In the illustrated embodiment, ECC generator 225 is configured to generate error correcting code, but in other embodiments, ECC generator 225 may be configured to perform any of various appropriate error detection and/or correction operations including checksums, parity computation, etc. In some embodiments, data units are associated with a number of bits on which error detection and/or correction is performed, which may be referred to interchangeably as an "ECC codeword," "ECC block" or "ECC chunk."

Write buffer 206 may be configured to store processed data for writing to storage banks 134. Write buffer 206 may allow for different clock domains between write pipeline 202 and storage bank(s) 134.

In the above discussion, exemplary embodiments of each of the structures of the illustrated embodiment of write pipeline 202 are described. However, it is noted that the illustrated embodiment is merely one example of how a write pipeline may be implemented. Alternative configurations and variations are possible and contemplated. Various data processing elements may be added, omitted, and/or re-ordered in various embodiments.

For example, in some embodiments, a data processing pipeline may include compression and/or decompression units. Data compression may improve performance of a storage device by allowing data to be stored in fewer portions of the storage media. As a result, data compression may increase the life of a storage device, e.g., because accessing compressed data may require a smaller number of write operations to the storage media.

Turning now to FIG. 2B, one embodiment of a system 200 that includes multiple write pipelines and multiple read pipelines is depicted. In the illustrated embodiment, system 200 includes buffers 207A-D, write pipelines 202A-N, and read pipelines 203A-N. As shown, system 200 may include any appropriate number of read and/or write pipelines. System 200 may also include a greater or smaller number of write pipelines than read pipelines.

Write pipelines 202A-N may each include multiple data processing elements such as those described in conjunction with FIG. 2A. Write pipelines 202A-N may be configured to separately process portions of a data stream and provide the results to storage bank(s) 134. Thus, different portions may be processed by different pipelines before being written to a storage medium. Processing may occur in parallel, concurrently and/or simultaneously. For example, different processing pipelines may perform the same operation (e.g., whitening) on different blocks at the same time. Processing operations may include compression operations, encryption operations, packetizer operations, whitening operations, error code operations, etc. In some embodiments, data processing elements may operate on data portions that are the size of a data unit produced by a packetizer. In other embodiments, data processing elements may perform operations on data portions that include multiple data units produced by a packetizer. Data units may span packet boundaries in some situations. In other situations, packets may include multiple data units.

Read pipelines 202A-N may each include one or more data processing elements. Speaking generally, the data processing elements of read pipelines 203A-N may be configured to reverse or complete various operations performed by write pipelines 202A-N. For example, each read pipeline may include data processing elements for that perform decompression operations, decryption operations, de-packetizing operations, de-whitening operations, error checking/correcting operations, etc.

Buffers 207A-D are illustrated using dashed lines to indicate that they may not be included in some embodiments. In one embodiment, buffers 207A-D are configured to buffer data for processing or provision to a storage media or a memory. In some embodiments, buffers 207A-D may be configured such that a block of data stored to the buffer may have a different size than a block of data read from the buffer. (In such an embodiment, buffers may be referred to as "wide buffers".) For example, a buffer 207 may include multiple entries each capable of storing a portion of data. In one embodiment, a block of data may be written into the buffer during a given write such that it fills multiple entries. Each entry may then be accessed individually so that a subset of the block of data is read out during a given read of the buffer. Said differently, as another example, buffer 207A may receive a data stream X bits wide during a given load of buffer 207A but allow 4X bits to be read from the buffer at a time. Similarly, buffer 207B may receive X bits of data at time but allow only X/4 bits to be read at a time. This may decouple clock domains and allow for ordering of processed data portions. Various buffers described herein may store data portions in the order in which they are received in order to help imply ordering when processing data units concurrently.

System 200 may include additional buffers (not shown) within each pipeline. For example, data may be buffered between different data processing elements that operate on blocks of data of different sizes. System 200's inclusion of multiple read and multiple write pipelines may allow greater read and/or write bandwidth for a storage device while running each pipeline at lower clock speeds than implementations with a single read or write pipeline.

Figure 3A:
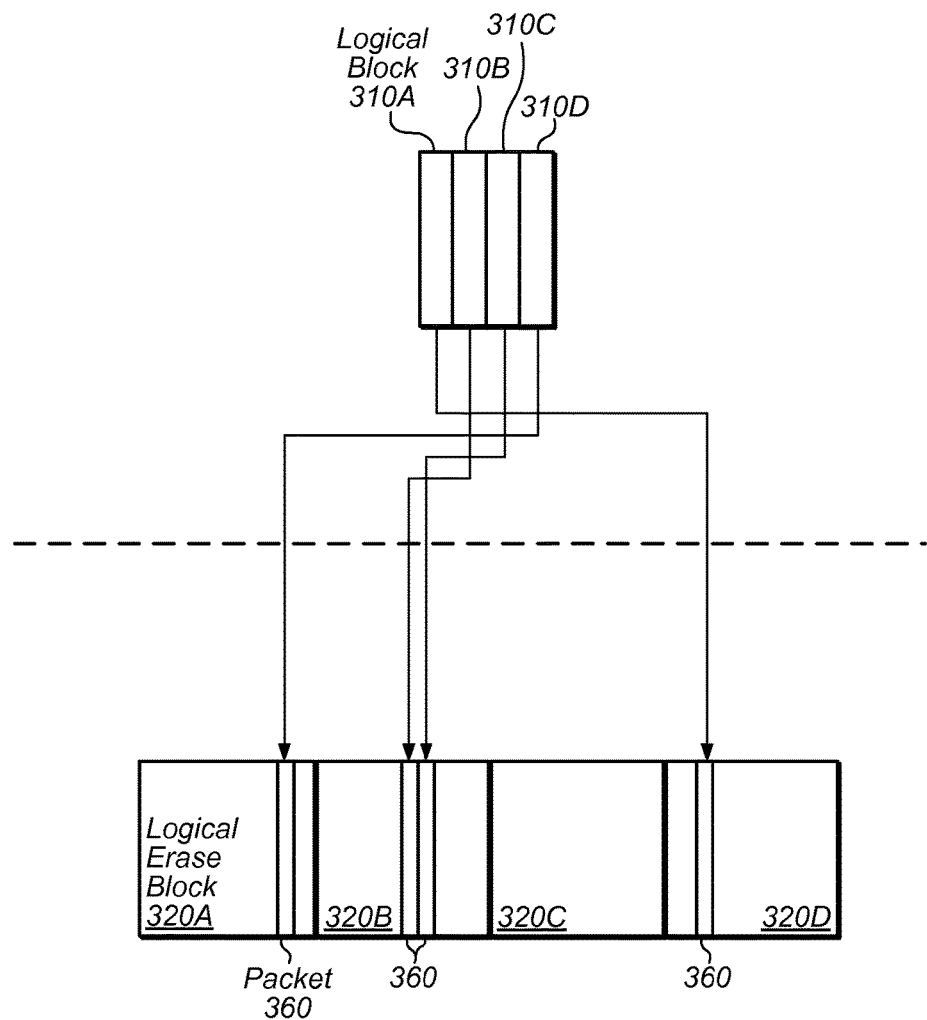
FIGS. 3A-3C are block diagrams illustrating embodiments of logical and physical address spaces.

Turning now to FIG. 3A, an exemplary mapping of a logical address space 302 to a physical address space 304 is depicted. In one embodiment, logical address space 302 represents the organization of data as perceived by higher-level processes such as applications 122. In one embodiment, physical address space 304 represents the organization of data on the physical media.

Logical address space 302, in one embodiment, is divided into logical addresses corresponding to respective logical blocks 310A-310D (also referred to as sectors). In some embodiments, the logical addresses are LBAs (in other embodiments, the logical addresses may correspond to some other form of logical identifiers). In one embodiment, sectors/blocks 310 represent the smallest block of data associated with a given logical address. As but one example, a block 310 may be approximately 512 bytes in size (while logical erase blocks and logical pages discussed below may be approximately 40 MB and 8 kB, respectively).

Physical address space 304, in one embodiment, is divided into physical addresses corresponding to the arrangement of data on the physical recording media. As will be discussed in further detail with respect to FIG. 3B, in one embodiment, the content of logical blocks 310 may be stored as packets 360 within logical erase blocks 320. As discussed with respect to FIG. 3C, in various embodiments, physical address space 304 may be organized as a log structure, in which write operations may be performed at only one or more append points.

Figure 3B:
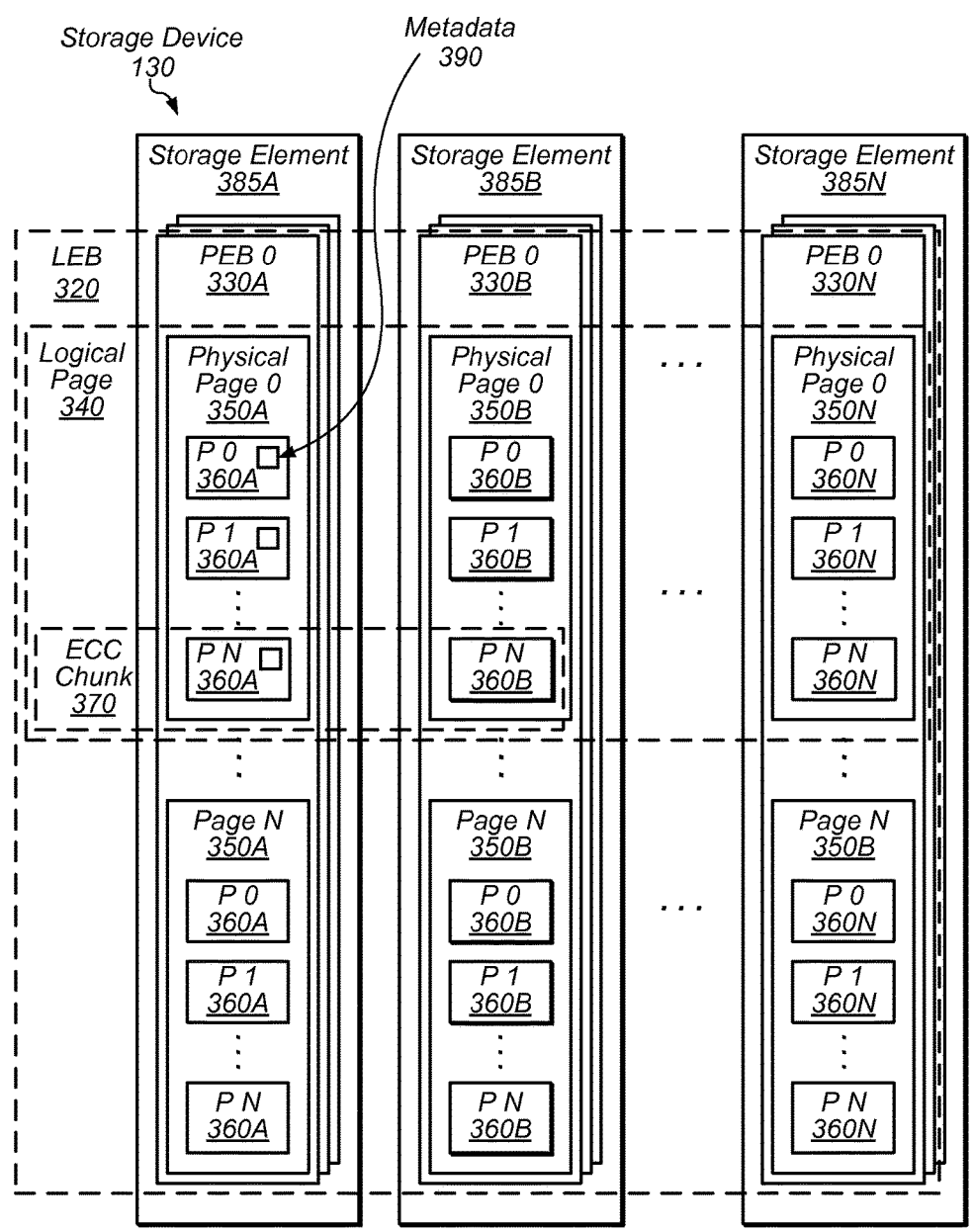

Turning now to FIG. 3B, a block diagram of storage blocks within the storage media of storage device 130 is depicted. In the illustrated embodiment, storage device 130 is organized into logical erase blocks (LEBs) 320 that include multiple physical erase blocks (PEBs) 330, which are located in separate storage elements 385A-N. Storage elements 385A-N may be pads or dies within a particular bank 134, for example. Each bank 134 may include 25 die, for example. Each die may be configured to receive one byte each clock cycle. A logical erase block 320 is further divided into multiple logical pages 340 (not to be confused with virtual memory pages) that, in turn, include multiple physical pages 350. Pages 350 include multiple packets 360, which may be grouped into ECC chunks 370. In other embodiments, packets may span ECC chunks.

As used herein, the term "erase block" refers broadly to a logical erase block or a physical erase block. In one embodiment, a physical erase block 330 represents the smallest storage block within a given storage element 385 that can be erased at a given time (e.g., due to the wiring of cells on the die). In one embodiment, logical erase blocks 320 represent the smallest block erasable by controller 132 in response to receiving an erase command. In such an embodiment, when controller 132 receives an erase command specifying a particular logical erase block 320, controller 132 may erase each physical erase block 330 within the block 320 simultaneously. It is noted that physical erase blocks 330 within a given logical erase block 320 (e.g., blocks 330A and 330B) may be considered as contiguous in physical address space 304 even though they reside in separate storage elements 385. Thus, the term "contiguous" may be applicable not only to data stored within the same physical medium, but also to data stored within separate media.

In one embodiment, a physical page 350 represents the smallest storage block within a given storage element 385 that can be written to at a given time. In one embodiment, a logical page 340 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 340 across multiple storage elements 385 may result in faster access times for a set of data when multiple storage elements 385 are accessed in parallel.

In one embodiment, a packet 360 represents the smallest storage block within a given storage element 385 that can be read at a given time. In one embodiment, an ECC chunk 370 is the smallest storage block readable by controller 132. In some embodiments, packets 360 may be slightly larger than logical blocks 310 as they may include the contents of a logical block 310 (or multiple blocks 310 in some instances) as well as a packet header and/or various metadata.

In some embodiments, driver 126 may associate metadata 390 with one or more of storage blocks 320-370. As used herein, the term "metadata" refers to system data usable to facilitate operation of solid-state storage device 130; metadata stands in contrast to, for example, data produced by an application (i.e., "application data") or forms of data that would be considered by an operating system as "user data." For example, in one embodiment, a logical erase block 320 may include metadata specifying, without limitation, usage statistics (e.g., the number of program erase cycles performed on that block 320), health statistics (e.g., a value indicative of how often corrupted data has been read from that block 320), security or access control parameters, sequence information (e.g., a sequence indicator), a persistent metadata flag (e.g., indicating inclusion in an atomic storage operation), a transaction identifier, or the like. In one embodiment, the header within a packet 360 may include packet metadata such as one or more LBAs associated with the contained data, the packet size, linkages to other packets, error correction checksums, etc. In various embodiments, driver 126 may use this information, along with other forms of metadata, to manage operation of storage device 130. For example, driver 126 may use this information to facilitate performance of read and write operations, recover storage device 130 to a previous state (including, for example, reconstruction of various data structures used by driver and/or replaying a sequence of storage operations performed on storage device 130), etc.

In other embodiments (not shown), metadata may be associated with various granularities of storage blocks 320-

370. For example, in one embodiment, sequence metadata is associated with an LEB. In this embodiment, blocks, sectors, code words, pages, logical pages, or erase blocks within each LEB may be maintained in a known or implied order. Thus, maintaining the sequence metadata for LEB's may inherently maintain the order of a log structure. Similarly, metadata may be associated with logical pages and ECC chunks as well as packets. Speaking generally, maintaining sequence information at a given level may be sufficient to maintain ordering when ordering is maintained or implied for smaller granularities of blocks within the level. Generally, "sequence" information refers to any information the maintains ordering between data units in the context of reading and writing a storage medium. Examples of sequence information include an index, a counter value, a pointer, etc.

In some embodiments, a packetizer module may communicate with driver 126 in order to associated metadata 390 with packets. The packetizer module may receive commands from driver 126 and appropriately insert packets headers and/or metadata into a data stream received by controller 132. These packet headers and metadata may be used to sequence data units processed by data processing pipelines 136.

Figure 3C:
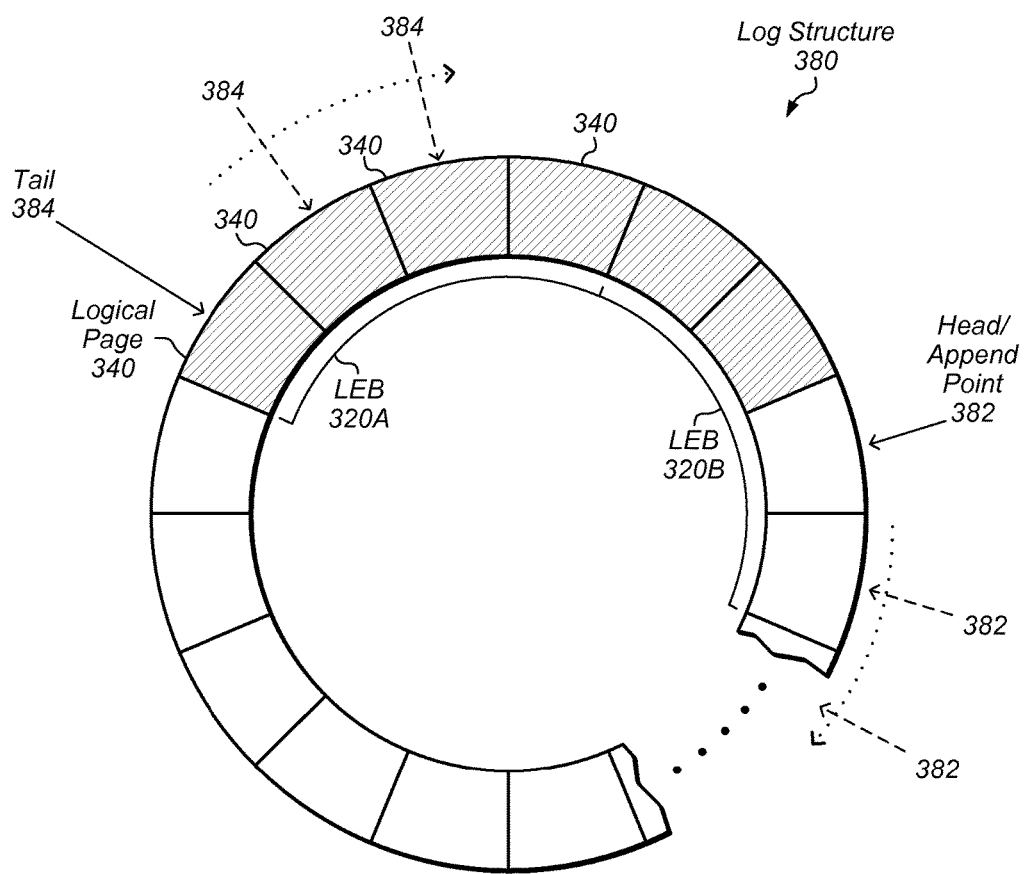

Turning now to FIG. 3C, a block diagram of log structure 380 within physical address space 304 is depicted. As shown, in various embodiments, data is stored sequentially at an append point 382 (also referred to as the "head") that starts an initial logical page 340. As additional data is stored, append point 382 advances sequentially to subsequent pages 340 in log structure 380 (clockwise in the depicted embodiment). Eventually, after storing enough data, the append point 382 reaches the "last" available page 340 in storage device 130, at which point the append point 382 wraps back to the initial page 340. Thus, log structure 380 is depicted as a loop/cycle. As more data is stored, the number of available pages 340 (shown as unshaded pages 340) decreases and the number of used pages 340 (shown as shaded pages 340) increases. As discussed above, in order to reuse these pages 340 (i.e., make them available to receive further writes), in one embodiment, driver 126 performs erase operations on logical erase blocks 320. In one embodiment, a tail 384 is maintained to identify the oldest page 340 still in use within structure 380 (pages other than the one located at the tail are considered to be younger than the tail). When the logical erase block 320 with the oldest page 340 is eventually erased, tail 384 is advanced forward to the next oldest page 340 in use at the end of log structure 380.

In general, data that is modified less frequently than other data in storage device 130 will migrate towards tail 384 (such data may be described as having a "colder temperature" or simply as "cold data"). On the other hand, data that is modified more frequently (described as having a "hotter temperature" or as "hot" data) will typically be located closer to head 382. Thus, valid data located in LEB 320A is likely "colder" than data in LEB 320B.

It is noted that, in other embodiments, data stored on storage media of storage device 130 may be organized in a non-log-structured format. As used herein, the terms "strict log structure" or "strict log order" refer to a structure in which write operations may be performed at only one append point, and are not allowed to "fill in" at locations behind the append point. Driver 126 may maintain statistics on how many times each block has been programmed and erased and/or health statistics about the number of corrupt bits for each erase block.

Driver 126 may include a groomer module for performing garbage collection to reclaim storage blocks so that they can be subsequently programmed to store data. In various embodiments, the functionality of a groomer may be implemented in software, hardware or a combination thereof. The groomer may be invoked when the amount of available space in storage 130 (i.e., the number of storage blocks that are able to currently be programmed) falls below a particular threshold. The groomer may then identify candidate storage blocks to be reclaimed (e.g., erased in the case of flash media) based on the amount of invalid data in those blocks (e.g., the groomer may identify blocks with the most invalid data). Once the groomer has determined to reclaim a candidate block, the groomer may copy any remaining valid data out of the block and write remaining valid data forward in the log structure (i.e., to the append point). The groomer may then initiate reclaiming the block by conveying appropriate commands to controller 132. In one embodiment, one or more data processing pipelines may be reserved or dedicated to reads and/or writes by the groomer.

Figure 4:
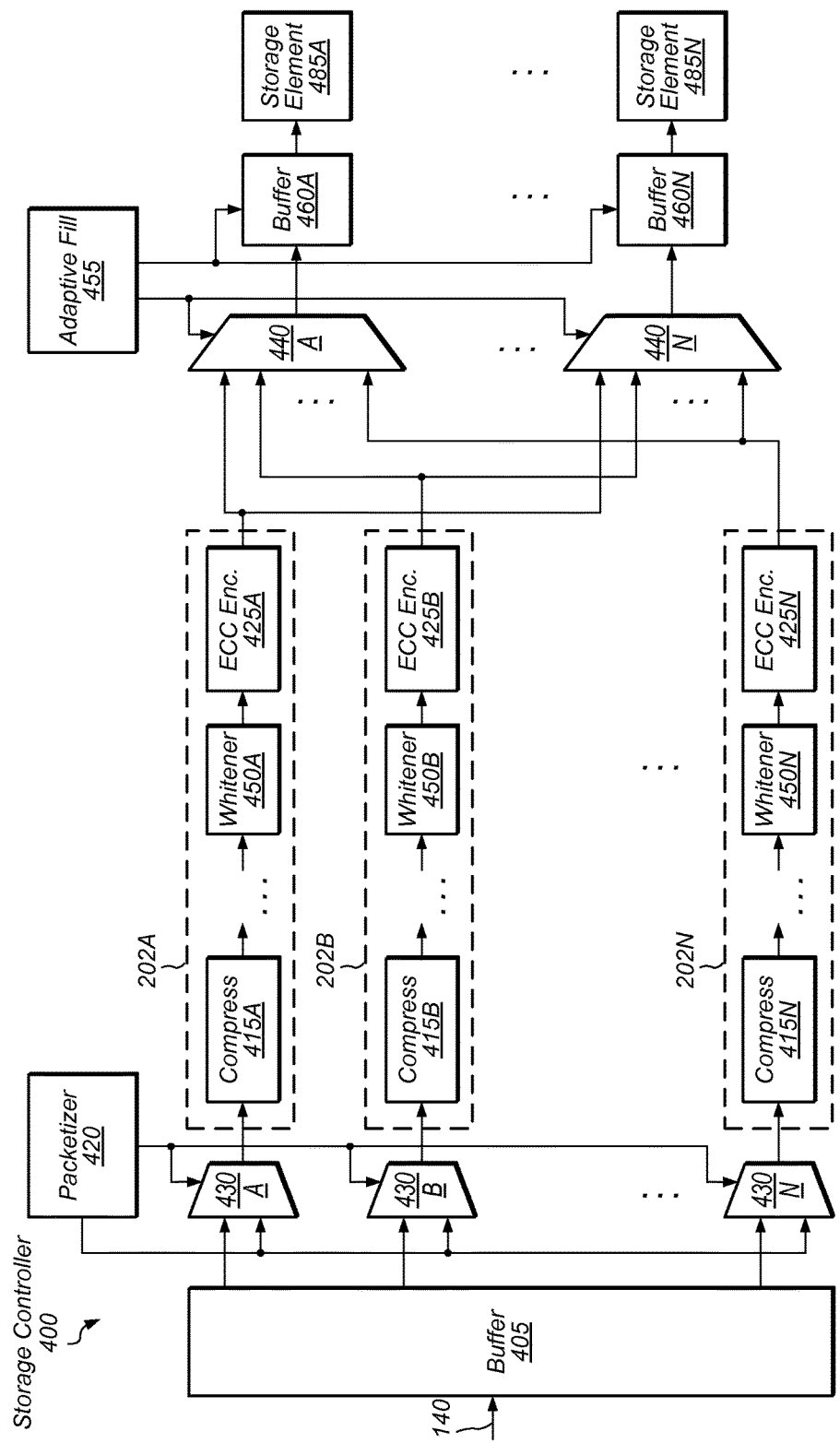
FIG. 4 is a block diagram illustrating an exemplary embodiment of a system that includes multiple write pipelines.

Turning now to FIG. 4, one embodiment of a storage controller 400 that includes parallel write pipelines 202A-N is shown. In the illustrated embodiment, storage controller 400 receives data to be written to storage device 130 via interconnect 140, processes the data using pipelines 202A-N, and writes the data to one or more of storage elements 485A-N. In the illustrated embodiment, storage controller 400 includes buffer 405, packetizer 420, multiplexers (MUX's) 430A-N, pipelines 202A-N (which each include at least one or more of a compress unit 415, a whitener 450, and an ECC encoder 425), MUX's 440A-N, buffers 460A-N, and an adaptive fill unit 455. In the illustrated embodiment, storage controller 400 is coupled to storage elements 485A-N.

In one embodiment, storage controller 400 includes a DMA unit (not shown) configured to access data in RAM 120 and provide the data to buffer 405 via interconnect 140. In some embodiments, buffer 405 allows pipelines 202A-N to operate in a different clock domain than interconnect 140. Buffer 405 may be a wide buffer than allows using a greater number of bits for reads (e.g., by MUX's 430A-N) than for writes (e.g., from interconnect 140). In one embodiment, data from interconnect 140 is stored in buffer 405 sequentially, in the order that it arrives.

Packetizer 420, in one embodiment, is configured to form data from buffer 405 into discrete data units. Packetizer 420 may include the functionality described above with reference to packetizer 220 of FIG. 2A. Further, in the illustrated embodiment, packetizer 420 is configured to control MUX's 430A-N in order to direct data to pipelines 202A-N. In other embodiments, packetizer 420 may use any of various appropriate circuitry in order to direct data packets to data processing pipelines. Packetizer 420 may translate packetizer commands from driver 126 into control signals and inputs for MUX's 430A-N. Packetizer 420 may insert information into data from buffer 405 with each data unit, which may allow for sequencing or ordering of the data units after processing in pipelines 202A-N. In other embodiments, sequencing information may be maintained at higher levels of granularity, e.g., at the LEB level. In these embodiments, sequencing of data units may be implied, e.g., by the order in which they enter/exit pipelines and/or the pipeline to which they are assigned.

In one embodiment, packetizer 420 is configured to separate a data stream into data units that are ECC chunks (e.g., the ECC chunks 370 of FIG. 3B) and provide data to pipelines 202A-N as ECC chunks. This data unit size may be preferable in embodiments where ECC encoders 425A-N are configured to operate on ECC chunks. In this embodiment, packetizer 420 may also be configured to insert header information for each packet within an ECC chunk. In other embodiments, packetizer 420 may be configured to implement data units of other granularities such as the size of packets 360, for example. In some embodiments, different data processing elements of pipelines 202A-N may be configured to operate on data units of different granularities. For example, compress unit 415A may be configured to operate on packets, which may be buffered into ECC chunks for processing by ECC encoder 425A. Speaking generally, various buffers may be included in storage controller 400 for separating clock domains, changing the granularity of data units in pipelines, allocating data units to appropriate pipelines, and so on.

In some embodiments, packetizer 420 may pass data through without inserting information in some situations. In some embodiments, one or more of pipelines 202A-N and/or 203A-N may be dedicated to data processing by a particular module or application or dedicated for user data only or for device management data only. For example, this may allow reads and writes by the groomer module of driver 126 to proceed along one pipeline without interfering with data processing for other reads and writes. Dedication or assignment of pipelines may be fixed or may be dynamic. Controller 132 or driver 126 may manage assignment of pipelines in embodiments where such assignment is dynamic.

In some embodiments, storage controller 400 may not include a wide buffer, but may send data from interconnect 140 directly to packetizer 420. In these embodiments, packetizer 420 may be configured to implement commands from driver 126 directly on a data stream rather than translating them into controls for a buffer and/or MUX. In this embodiment, packetizer 420 may include a decoder for determining which data units should be sent to each write pipeline 202.

In the illustrated embodiment, each write pipeline 202 includes a compress unit 415, a whitener 450, and an ECC encoder 425. Write pipelines 202A-N illustrate one possible set and ordering of data processing elements. In other embodiments, any of various appropriate data processing elements may be included in each write pipeline 202. Further, data processing elements may be omitted or re-ordered in various embodiments.

Compress units 415A-N, whiteners 450A-N, and ECC encoders 425A-N may be configured as described above with reference to the data processing elements 215, 225, and 230 of FIG. 2A. For example, ECC encoders 425A-N may be configured to generate error correcting code data for each processed data unit. As discussed above, these data processing elements may be configured to operate on data units of various granularities.

Adaptive fill unit 455, in one embodiment, is configured to sequence or order processed data units from pipelines 202A-N and write the data units to storage elements 485A-N. Storage elements 485A-N may be NAND dies, for example. Adaptive fill unit 455 may perform the sequencing based on sequencing information inserted by packetizer 420. In other embodiments, sequencing may be implied based on the order in which data units arrive and the pipeline in which they are processed. This may require user application data to keep strict ordering in order to enforce the implied order. Adaptive fill unit 455 may order data units in buffers 460A-N by controlling MUX's 440A-N. Ordering or sequencing may be associated with the log structure of FIG. 3C at any of various storage block granularities which may or may not correspond to the size of a data unit. Storage controller 400 may store the sequencing information along with data in storage elements 485A-N in order to reconstruct the log structure in the case of data corruption.

As described with reference to FIG. 3B, storage controller 400 may be configured to write a logical page 340 across multiple physical pages and thus across multiple storage elements. Thus, adaptive fill unit 455 may be configured to write data sequentially, e.g., starting with storage element 485A and ending with storage element 485N before repeating. However, some storage elements may be marked as invalid or unavailable (e.g., in response to data corruption, which may be detected by ECC failure or parity failure, or the bank may be busy servicing a different storage request). Thus, in one embodiment, adaptive fill unit 455 is configured to skip these indicated storage elements when writing data from buffers 460A-N. In other embodiments, adaptive fill unit 455 may write filler data to those storage elements, such as a majority of binary 1's or some other predefined pattern, for example. Thus, adaptive fill unit 455 may be configured to insert filler data into buffers 460A-N for indicated storage elements. In various embodiments, adaptive fill unit 455 may be configured to skip storage elements based on the status of those storage elements. Examples of such status include: busy, retired, temporarily retired, failed, unavailable, etc.

In some embodiments, parity encoding is performed on data in buffers 460A. In one embodiment, parity information is stored on a designated one of storage elements 485A-N. Parity may be generating generated using various techniques for various data layouts. In one embodiment, for example, data is byte interleaved across storage elements 485A-N. In this embodiment, bytes of each ECC block may be distributed across storage elements 485A-N. In this embodiment, parity may be generated for a row of bytes at a time, which may be part of the same ECC block. For example, in an embodiment with 25 storage elements 485, parity may be generated for 24 bytes and stored as a byte on a $25^{th}$ storage element. In other embodiments, other data layouts such as vertical stripe may be implemented. In vertical stripe arrangements, ECC blocks may each be stored on a particular storage element 485, rather than distributed across multiple storage elements 485. Thus, byte interleaving may be described as a horizontal striping of data across rows that span multiple storage elements 485 in contrast to vertical stripe arrangements in which ECC blocks may be stored along a single storage element 485. In vertical stripe embodiments, parity information may be generated for bytes of multiple ECC blocks (e.g., parity may be generated across a particular row of multiple storage elements, which may store multiple ECC blocks). In other embodiments a hybrid of byte interleaving and vertical stripe may be implemented, e.g., by storing ECC blocks on particular pluralities of storage elements. In hybrid embodiments, an ECC block may be stored using multiple horizontal rows (e.g., across multiple storage elements) as well as multiple vertical columns (e.g. storage elements). In still other embodiments, any of various appropriate data layouts and parity generation techniques may be implemented. Adaptive fill unit 455 may be configured to select between even parity and odd parity depending on the number of available storage elements in storage elements 485A-N.

In embodiments where pipelines 202A-N operate on ECC blocks, each pipeline may be responsible for 1/N ECC chunks intended for a given NAND page, where N is the number of pipelines 202. In this embodiment, buffer 405 may be a single wide buffer of width=N times the size of the smallest data unit used, and ECC blocks may be distributed to pipelines from this buffer. In order to keep all of the pipelines busy, buffer 405 may buffer at least N times (N−1)/2 ECC blocks. In other embodiments, DMA instructions may be recoded to fetch data units for individual pipelines, which may reduce buffering requirements.

Including multiple pipelines in storage controller 400 may allow data processing elements in each pipeline 202 to operate at lower clock frequencies while still maintaining high data processing bandwidth. Further, disclosed implementations of packetizer 420 and adaptive fill unit 455 may preserve sequencing associated with a log structure even when processing data units using multiple pipelines.

In the above discussion, exemplary embodiments of each of the structures of the illustrated embodiment of storage controller 400 are described. However, it is noted that the illustrated embodiment is merely one example of how a storage controller may be implemented. Alternative configurations and variations are possible and contemplated. Various units and/or data processing elements may be added, omitted, and/or re-ordered in various embodiments.

Figure 5:
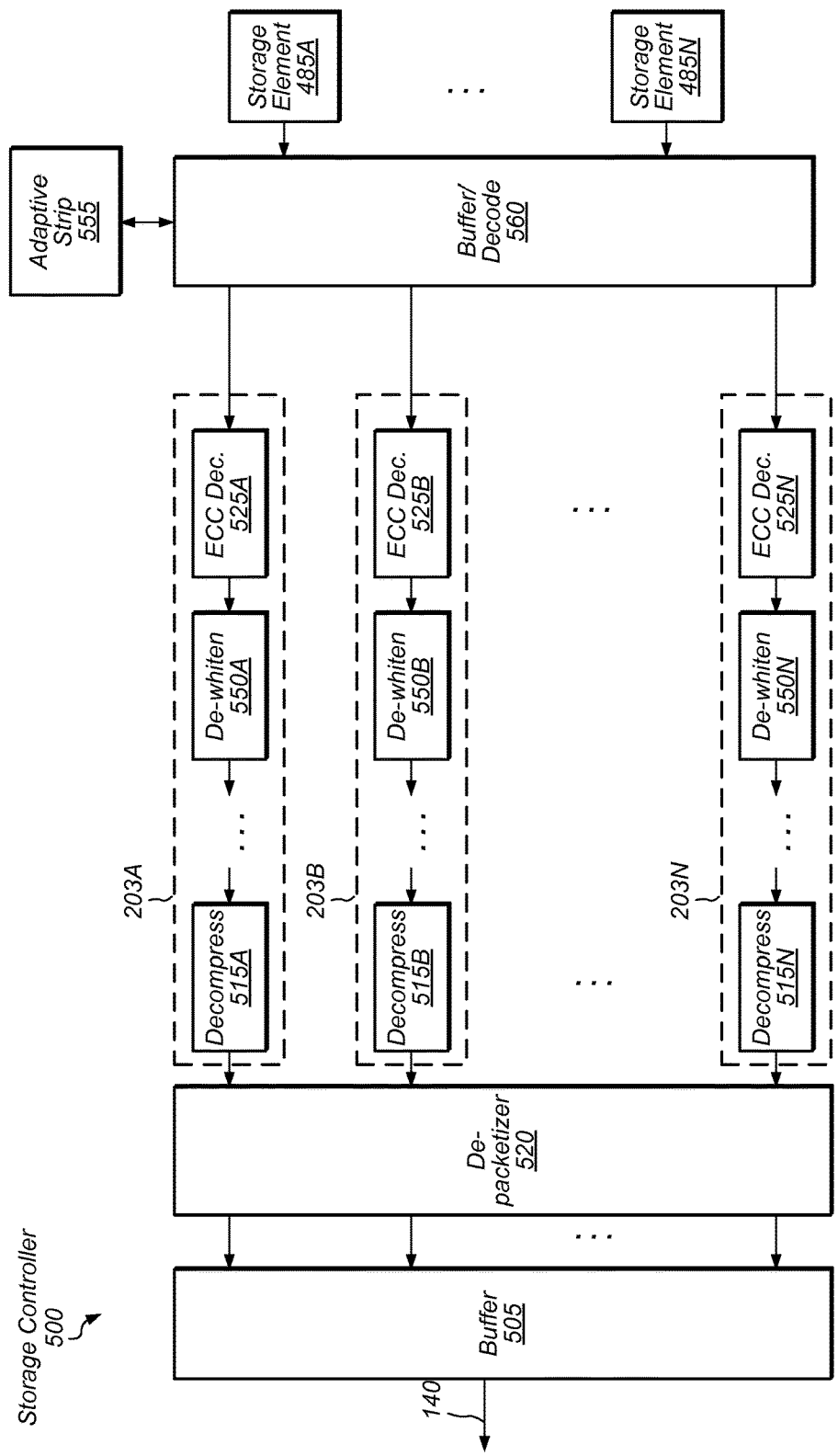
FIG. 5 is a block diagram illustrating an exemplary embodiment of a system that includes multiple read pipelines.

Turning now to FIG. 5, one embodiment of a storage controller 500 that includes multiple read pipelines is shown. In the illustrated embodiment, storage controller 500 retrieves data from storage elements 485A-N into buffer/decoder 560, processes the data using read pipelines 203A-N, and provides the data to interconnect 140. In the illustrated embodiment, storage controller 500 includes buffer 505, de-packetizer 520, pipelines 203A-N (which each include at least a decompress unit 515, a de-whitener 550, and an ECC decoder 525), buffer/decoder 560, and adaptive strip unit 555. In the illustrated embodiment, storage controller 500 is coupled to storage elements 485A-N.

Adaptive strip unit 555, in one embodiment, is configured to read data from storage elements 485A-N and remove any filler data written by adaptive fill unit 455. Adaptive strip unit 555 may also be configured to control buffer/decoder 560 in order to send data to pipelines 203A-N. Adaptive strip unit 555 may also check parity for data from storage elements 485A-N.

In the illustrated embodiment, each read pipeline 203 includes a decompress unit 515, a de-whitener 550, and an ECC decoder 525. Read pipelines 203A-N illustrate one possible set and ordering of data processing elements. In other embodiments, any of various appropriate data processing elements may be included in each read pipeline 203. Further, data processing elements may be omitted or re-ordered in various embodiments.

Decompress units 515A-N, de-whiteners 550A-N, and ECC decoders 525A-N may be configured to undo one or more of the operations performed by write pipelines 202A-N. For example, ECC decoders 525A-N may be configured to check error correcting code for each processed data unit and correct data errors if possible. Similarly, de-whiteners 550A-N may be configured to undo a whitening operation (e.g., by extracting the data from combination with a pseudo-random pattern) to reconstruct data prior to whitening, and decompress units 515A-N may be configured to decompress compressed data. These data processing elements may be configured to operate on data units of various granularities with any of various appropriate buffers in between.

De-packetizer 520 may be configured to remove metadata from received data units. For example, de-packetizer 520 may be configured to remove packet header information from data packets and generate a data stream for buffer 505. De-packetizer may confirm that a physical address indicated in a packet header matches a desired physical address. Data in buffer 505 may be provided to RAM 120, e.g., via a DMA unit or via any appropriate method. In one embodiment, de-packetizer 520 may be configured to pass data through without removing header data, to insert particular data patterns into a stream of data, and/or to remove particular data patterns from a stream of data.

De-packetizer 520 may be configured to sequence or order data in buffer 505 based on sequencing information inserted by packetizer 420, for example. Alternatively, de-packetizer 520 may order data implicitly, e.g., based on the order in which it arrives.

In the above discussion, exemplary embodiments of each of the structures of the illustrated embodiment of storage controller 500 are described. However, it is noted that the illustrated embodiment is merely one example of how a storage controller may be implemented. Alternative configurations and variations are possible and contemplated. Various units and/or data processing elements may be added, omitted, and/or re-ordered in various embodiments.

Figure 6:
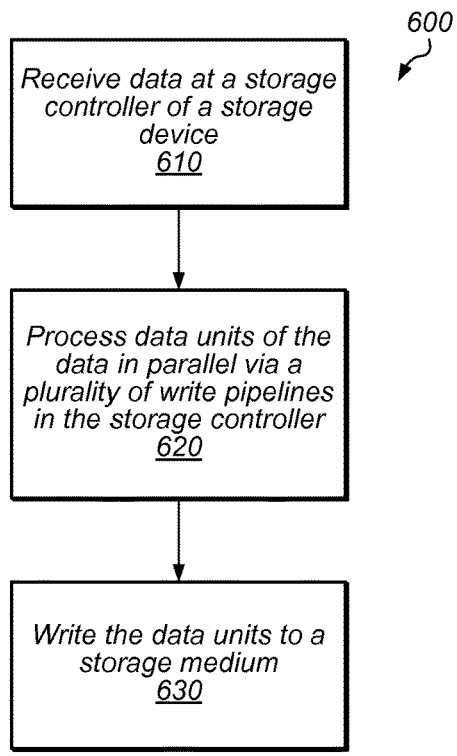
FIG. 6 is a flow diagram illustrating one embodiment of a method.

Turning now to FIG. 6, a method 600 is depicted. Method 600 is one embodiment of a method that may be performed by an apparatus such as storage device 130. In one embodiment, the apparatus may execute program instructions to perform method 600. In one embodiment, the apparatus may perform method 600 based on commands from driver 126. Flow begins at block 610.

At block 610, data is received at a storage controller of a storage device. The data may be provided by a DMA unit. Flow proceeds to block 620.

At block 620, data units of the data are processed in parallel via a plurality of write pipelines in the storage controller. The processing may include compression, encryption, whitening, error code generation, parity generation, etc. The data units may be data units of any appropriate granularity. Flow proceeds to block 630.

At block 630, the data units are written to a storage medium. In one embodiment, adaptive fill unit 455 writes the processed portions of a data stream to available storage elements of the storage device. Adaptive fill unit 455 may sequence processed data units based on information inserted by packetizer 420. The sequence may be associated with a log structure, as described above with reference to FIG. 3C. Flow ends at block 630.

In another embodiment, a method for reading data includes reading data from a storage medium, separately processing portions of the data concurrently using a plurality of read pipelines in a storage controller, and providing processed data. The providing the processed data may include providing the data in a sequence associated with a log structure.

Figure 7:
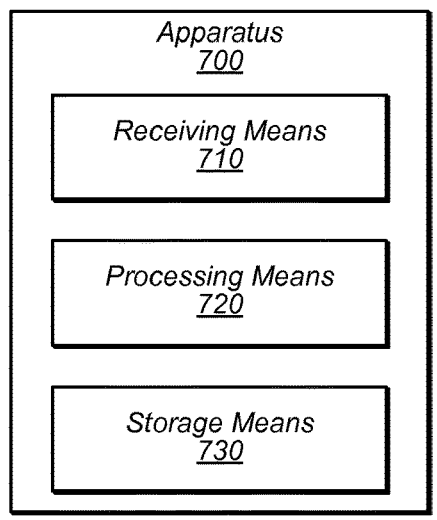
FIG. 7 is a block diagram of an apparatus having a receiving means, a processing means, and a storage means.

Turning now to FIG. 7, a block diagram of an apparatus 700 that includes a receiving means 710, a processing means 720, and a storage means 730 is depicted. Apparatus 700 may correspond to any suitable structure having the functionality of receiving means 710, processing means 720, and storage means 730. For example, apparatus 700 may be any suitable type of computing device such as a server, laptop, desktop, a mobile device, etc. In some embodiments, apparatus 700 may include multiple computing devices working together. In some embodiments, apparatus 700 is a controller (such as controller 132) included in a card that also includes and one or more storage elements (such as storage elements 385).

In various embodiments, receiving means 710 may implement any of the functionality described herein with respect to buffer 405 and/or packetizer 420. Accordingly, in one embodiment, receiving means 710 receives a stream of data and forms the data into discrete data units. This may include inserting information into the stream of data, which may include sequencing information. The data units may correspond to ECC chunks, packets, both, and/or other data unit sizes. In some embodiments, receiving means 710 may also implement functionality other than that described in conjunction with buffer 405 and packetizer 420. Accordingly, the phrase "means for receiving a stream of data and forming the data into discrete data units" refers to any of the structures listed above as well as their corresponding equivalents.

In various embodiments, processing means 720 may implement any of the functionality described herein with respect to storage controller 400. Accordingly, in one embodiment, processing means 720 may separately process the data units simultaneously. The separately processing may be performed in parallel by a plurality of data processing pipelines. The separately processing may include various compression, encryption, whitening, error code, and/or parity operations as well as any other appropriate data processing operations. In some embodiments, processing means 720 may also implement functionality other than that described in conjunction with storage controller 400. Accordingly, the phrase "means for separately processing the data units simultaneously" refers to any of the structures listed above as well as their corresponding equivalents.

In various embodiments, storage means 730 may implement any of the functionality described herein with respect to adaptive fill unit 455, buffers 460A-N, and/or storage elements 485A-N. Accordingly, on one embodiment, storage means 730 may write the data units to a storage medium. Storage means 730 may write the data according to a sequence indicated by sequencing information or according to a sequence implied by the order in which data units arrive from processing means 720. The writing may include writing the information adaptively based on available storage elements. The sequence may be associated with a log structure. In some embodiments, storage means 730 may also implement functionality other than that described in conjunction with adaptive fill unit 455, buffers 460A-N, and storage elements 485A-N. Accordingly, the phrase "means for writing the data units to a storage medium" refers to any of the structures listed above as well as their corresponding equivalents.

Figure 8:
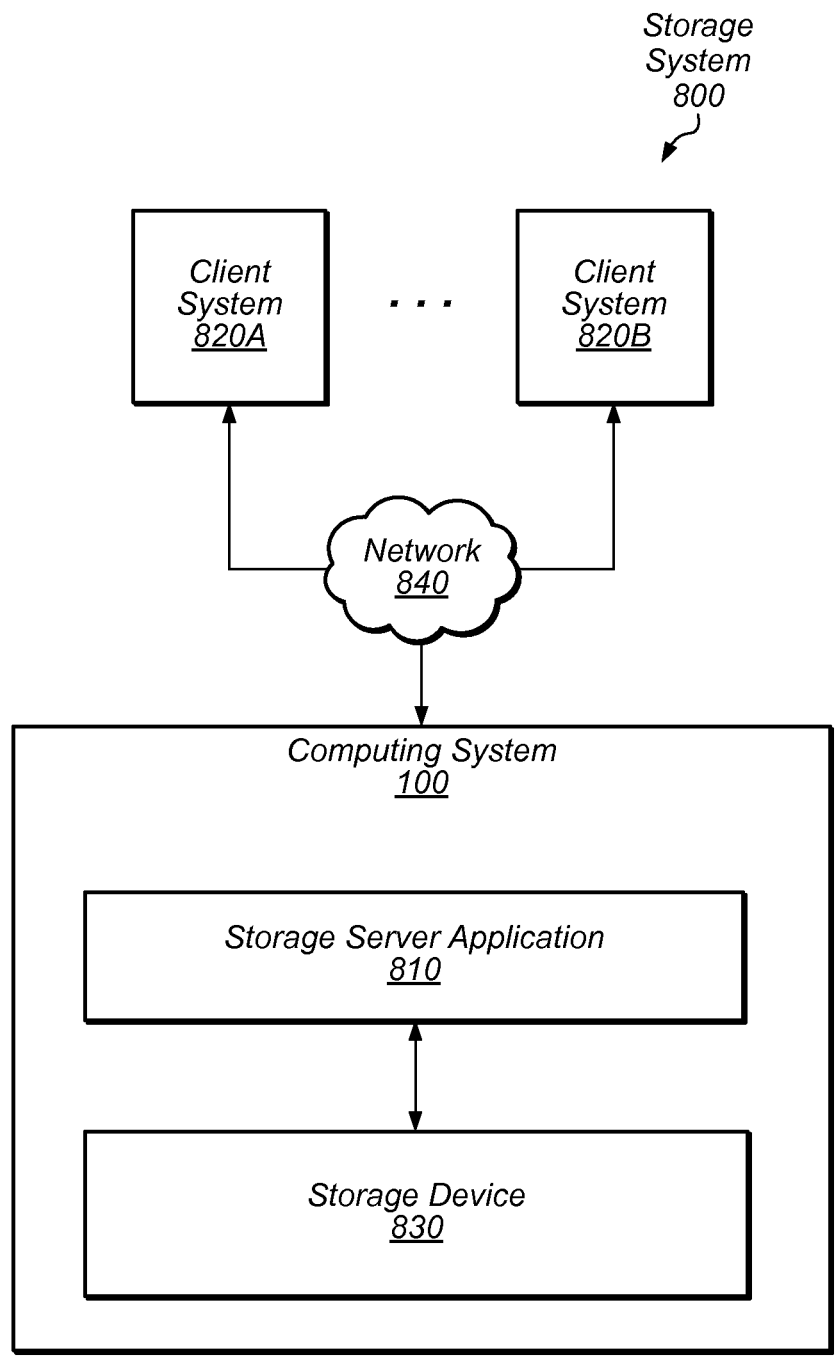
FIG. 8 is a block diagram illustrating one embodiment of a storage system.

Turning now to FIG. 8, a block diagram of a storage system 800 including computing system 100 is depicted. As discussed above, computing system 100 may include applications 122 that operate on data stored in storage device 830. In the illustrated embodiment, computing system 100 executes a storage server application 810 to enable client systems 820A and 820B to access and store data in storage device 830 via network 840. For example, in one embodiment, storage system 800 may be associated within an enterprise environment in which storage server application 810 distributes enterprise data from storage device 830 to clients 820. In some embodiments, clients 820 may execute other server applications such as web servers, mail servers, virtual private network (VPN) servers, etc. to further distribute data to other computing systems. Accordingly, in some embodiments, storage server application 810 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving data at a storage controller comprising a plurality of write pipelines, each write pipeline capable of being communicatively coupled to any one of a plurality of storage devices, wherein each of the plurality of storage devices comprises a die configured for data storage;
   processing at least first data units of the data and second data units of the data concurrently by use of the plurality of data pipelines, the plurality of data pipelines configured to perform one or more operations on the first and second data units, wherein the one or more operations includes at least compression, whitening, error code generation, parity generation, or encryption;
   writing the processed first and second data unit, the writing comprising:
      coupling each write pipeline to a respective storage device selected for the write pipeline;
      wherein writing the processed first data units comprises coupling a first one of the write pipelines to a first one of the storage devices and writing the processed second data units comprises coupling a second one of the write pipelines to the first one of the storage devices.

2. The method of claim 1, wherein writing the processed first and second data units further comprises:
   selecting storage devices for the write pipeline according to a sequence determined prior to processing the first and second data units by the plurality of write pipelines.

3. The method of claim 1, further comprising:
   storing header information with one or more of the processed first and second data units on the storage medium, wherein the header information indicates one or more logical block addresses associated with the one or more of the processed first and second data units.

4. The method of claim 1, wherein writing the processed first and second data units further comprises:
   selecting storage devices for the write pipelines based on availability of the plurality of storage devices.

5. The method of claim 1, further comprising:
   reading requested data from the storage medium; and
   processing data units of the requested data in parallel via a plurality of read pipelines.

6. The method of claim 1, wherein writing the processed first and second data units further comprises appending the processed first and second data units to a storage log.

7. An apparatus, comprising:
a storage controller comprising;
a plurality of data pipelines; and
select logic configured to coupled the data pipelines to respective memory devices of a plurality of memory devices, wherein each of the plurality of memory devices comprises a die configured for data storage;
wherein the storage controller is configured to:
receive data for storage on the storage medium,
process first data units of the data and second data units of the data concurrently by use of the plurality of data pipelines, the plurality of data pipelines configured to perform one or more operations on the first and second data units, wherein the one or more operations include at least compression, whitening, error code generation, parity generation, or encryption;
couple the plurality of data pipelines to respective memory devices of the plurality of memory devices by use of the select logic; and
write the processed first and second data units to the respective memory devices coupled to the plurality of data pipelines;
wherein writing the first data units comprises coupling a first one of the data pipelines to a first memory device and writing the second data units comprises coupling a second one of the data pipelines to the first memory device.

8. The apparatus of claim 7, wherein the storage controller is further configured to write the processed first and second data units at an append point of a storage log.

9. The apparatus of claim 7, wherein:
couplings between the plurality of data pipelines and the respective memory devices correspond to an ordering of the processed first and second data units; and
the storage controller is further configured to select respective memory devices to couple to the plurality of data pipelines based on one or more of:
sequencing information inserted into the first and second data units by one or more of the data pipelines;
an order in which the first and second data units were received at the storage controller;
an order in which the first and second data units were processed by the plurality of data pipelines; and
a log order of the data.

10. The apparatus of claim 7, wherein the storage controller is further configured to insert information into the data received at the storage controller.

11. The apparatus of claim 10, wherein the storage controller is configured to write the inserted information to the respective memory devices coupled to the plurality of data pipelines.

12. The apparatus of claim 7, wherein each memory device comprises one or more of a memory chip, a memory plane, and a memory pad.

13. The apparatus of claim 7, further comprising:
a plurality of read pipelines configured to perform one or more operations on separate portions of data retrieved from respective memory devices of the plurality of memory devices in parallel.

14. The apparatus of claim 7, further comprising a groomer configured to relocate data within the plurality of memory devices, wherein one or more of the plurality of data processing pipelines of the storage controller are reserved for processing data being relocated by the groomer.

15. A data storage device, comprising:
a storage controller comprising a plurality of data processing pipelines, the storage controller configured to:
receive data for storage on a storage medium comprising a plurality of storage devices, wherein each of the plurality of storage devices comprises a die configured for data storage;
process at least a first portion of the data and a second portion of the data, the first and second portions of the data being processed substantially concurrently by respective data processing pipelines of the plurality of data processing pipelines, the plurality of data processing pipelines configured to perform one or more operations on the first and second portions of the data, wherein the one or more operations includes at least compression, whitening, error code generation, parity generation, or encryption;
couple the plurality of data processing pipelines to respective storage devices of the plurality of storage devices; and
write the processed first and second portions of the data to the storage medium;
wherein the storage controller is configured to write the processed first and second portions of the data to a selected storage device of the storage medium.

16. The storage device of claim 15, wherein the storage controller is further configured to process respective portions of data retrieved from the storage devices by use of respective data processing pipelines of the plurality of data processing pipelines.

17. The storage device of claim 15, further comprising a direct memory access (DMA) unit configured to receive the data for storage on the storage medium.

18. The storage device of claim 15, wherein the storage controller is further configured to select the storage devices to write the processed first and second portions of the data based on one or more of:
sequencing information inserted into one or more of the first and second portions of the data by one or more of the data processing pipelines;
an order in which the first and second portions of the data were received at the storage controller;
an order in which the first and second portions of the data were processed by the respective data processing pipelines; and
a log order of the first and second portions of the data.

19. A system, comprising:
means for writing at least first data units and second data units of data to a storage medium comprising a plurality of storage devices, wherein each of the plurality of storage devices comprises a die configured for data storage;
a plurality of processing means configured to process the first and second data units, each of the first data units and the second data units being processed by a respective one of the plurality of processing means substantially simultaneously, the plurality of processing means configured to perform one or more operations on the first and second data units, wherein the one or more operations include at least compression, whitening, error code generation, parity generation, or encryption;
means for selectively coupling each of the processing means to a respective storage device of the plurality of storage devices; and means for writing the first and second data units processed by the respective processing means to the respective storage device selectively coupled to the respective processing means;

wherein writing the first data units to the storage medium comprises writing the first data units processed by a first one of the processing means to a first one of the plurality of storage devices, and wherein writing the second data units to the storage medium comprises writing the second data units processed by a second one of the processing means to the first one of the plurality of storage devices.

* * * * *